US007277930B2

(12) United States Patent
Hillis et al.

(10) Patent No.: US 7,277,930 B2

(45) Date of Patent: Oct. 2, 2007

(54) SWITCHING/LIGHTING CORRELATION SYSTEM

(75) Inventors: W. Daniel Hillis, Encino, CA (US); Russel Howe, Montrose, CA (US)

(73) Assignee: Herman Miller, Inc., Zeeland, MI (US)

( * ) Notice: Subject to any disclaimer, the term of this patent is extended or adjusted under 35 U.S.C. 154(b) by 235 days.

(21) Appl. No.: 10/500,734

(22) PCT Filed: Apr. 18, 2003

(86) PCT No.: PCT/US03/12210

§ 371 (c)(1),
(2), (4) Date: Nov. 12, 2004

(87) PCT Pub. No.: WO03/089974

PCT Pub. Date: Oct. 30, 2003

(65) Prior Publication Data

US 2005/0070760 A1 Mar. 31, 2005

Related U.S. Application Data

(60) Provisional application No. 60/374,012, filed on Apr. 19, 2002.

(51) Int. Cl.
*G06F 15/16* (2006.01)

(52) U.S. Cl. .................. 709/219; 709/220; 340/825.69

(58) Field of Classification Search ..................... None
See application file for complete search history.

(56) References Cited

U.S. PATENT DOCUMENTS 4,727,296 A 2/1988 Zaharchuk et al.
4,797,599 A 1/1989 Ference et al.
4,850,009 A 7/1989 Zook et al.
5,131,019 A 7/1992 Sheffer et al.
5,191,265 A 3/1993 D'Aleo et al.
5,552,327 A 9/1996 Bachmann
5,905,442 A 5/1999 Mosebrook
5,962,992 A 10/1999 Huang
6,085,576 A 7/2000 Sunshine et al.
6,182,130 B1 1/2001 Dolin, Jr. et al.
6,196,467 B1 3/2001 Dushane et al.
6,211,627 B1 4/2001 Callahan
6,290,134 B1 9/2001 Rando et al.
6,353,861 B1 3/2002 Dolin, Jr. et al.
2002/0173289 A1* 11/2002 Pacsai et al. ............... 455/343

FOREIGN PATENT DOCUMENTS

EP 0 780 953 6/1997
GB 2 345 367 5/2000

* cited by examiner

*Primary Examiner*—Duy-Vu N Deo
(74) *Attorney, Agent, or Firm*—Varnum, Riddering, Schmidt & Howlett LLP

(57) ABSTRACT

A correlation system (100) is disclosed, for use with a lighting system (102). The lighting system (102) is associated with one or more wands (104) so as to initially configure or reconfigure relationships and correlation among switches and lights of the lighting system (102). The lighting system (102) includes a plurality of lighting units (106). The lighting system (102) also includes a plurality of switch units (128). The wand (104) includes an IR emitter (160) to transmit signals to said lighting units (106) and to said switch units (128) so as to effect controlling relationships among the switch units (128) and lighting units (106).

18 Claims, 2 Drawing Sheets

SWITCHING/LIGHTING CORRELATION SYSTEM

CROSS-REFERENCE TO RELATED APPLICATIONS

This application is based on U.S. Provisional Patent Application Ser. No. 60/374,012 filed Apr. 19, 2002 and entitled SWITCHING/LIGHTING CORRELATION SYSTEM.

STATEMENT REGARDING FEDERALLY SPONSORED RESEARCH OR DEVELOPMENT

Not applicable.

REFERENCE TO A MICROFISHE APPENDIX

Not applicable.

BACKGROUND OF THE INVENTION

1. Field of the Invention

The invention relates to environmental control systems and, more particularly, to means for configuring control among switching and lighting apparatus.

2. Background Art

A significant amount of work is currently being performed in technologies associated with control of what can be characterized as "environmental" systems. Such systems may be utilized in commercial and industrial buildings, residential facilities, transportation systems and other environments. Control functions may vary from relatively conventional HVAC temperature control to extremely sophisticated systems for control of the entirety of a city's subway complex.

Development is also being undertaken in the field of network technologies for controlling environmental systems. References are often made in current literature to "smart" buildings or rooms having automated and centralized environmental functionality. This technology provides for networks controlling a number of separate and independent functions, including temperature, lighting and the like.

There are a number of issued patents directed to various aspects of control of environmental systems. For example, Callahan, U.S. Pat. No. 6,211,627 B1 issued Apr. 3, 2001 discloses lighting systems specifically directed to entertainment and architectural applications. The Callahan lighting systems include apparatus which provide for distribution of electrical power to a series of branch circuits, with the apparatus being reconfigurable so as to place the circuits in a dimmed or "not-dimmed" state, as well as a single or multi-phase state. Callahan further discloses the concept of encoding data in a form detectable in electrical load wiring and at the load. The data may include dimmer identification, assigned control channels, descriptive load information and remote control functionality. For certain functions, Callahan also discloses the use of a handheld decoder.

D'Aleo et al., U.S. Pat. No. 5,191,265 issued Mar. 2, 1993 disclose a wall-mounted lighting control system. The system may include a master control module, slave modules and remote control units. The system is programmable and modular so that a number of different lighting zones may be accommodated. D'Aleo et al. also disclose system capability of communicating with a remote "power booster" for purposes of controlling heavy loads.

Dushane et al., U.S. Pat. No. 6,196,467 B1 issued Mar. 6, 2001 disclose a wireless programmable thermostat mobile unit for controlling heating and cooling devices for separate occupation zones. Wireless transmission of program instructions is disclosed as occurring by sonic or IR communication.

Other patent references disclose various other concepts and apparatus associated with control systems in general, including use of handheld or other remote control devices. For example, Zook et al., U.S. Pat. No. 4,850,009 issued Jul. 18, 1989 disclose the use of a portable handheld terminal having optical barcode reader apparatus utilizing binary imaging sensing and an RF transceiver. Sheffer et al., U.S. Pat. No. 5,131,019 issued Jul. 14, 1992 disclose a system for interfacing an alarm reporting device with a cellular radio transceiver. Circuitry is provided for matching the format of the radio transceiver to that of the alarm reporting unit. Dolin, Jr. et al., U.S. Pat. No. 6,182,130 B1 issued Jan. 30, 2001 disclose specific apparatus and methods for communicating information in a network system. Network variables are employed for accomplishing the communication, and allow for standardized communication of data between programmable nodes. Connections are defined between nodes for facilitating communication, and for determining addressing information to allow for addressing of messages, including updates to values of network variables. Dolin, Jr. et al., U.S. Pat. No. 6,353,861 B1 issued Mar. 5, 2002 disclose apparatus and methods for a programming interface providing for events scheduling, variable declarations allowing for configuration of declaration parameters and handling of I/O objects.

Although a number of the foregoing references describe complex programming and hardware structures for various types of environmental control systems, it is desirable for certain functions associated with environmental control to be readily useable by the layperson. This is particularly true at a specific location, where it may be desirable to readily initially configure or reconfigure relationships or "correlation" between, for example, switching devices and lighting apparatus. Also, it may be desirable for such capability of initial configuration or reconfiguration to preferably occur within the proximity of the switching and lighting apparatus, rather than at a centralized or other remote location.

SUMMARY OF THE INVENTION

In accordance with the invention, a correlation system is provided for configuring and modifying a control relationship between controlling and controlled apparatus. The correlation system includes programming means comprising a hand-held configuration. The programming means is manually operable by a user so as to transmit correlation signals to the controlled apparatus and to the controlling apparatus. The controlled apparatus and the controlling apparatus each have sensing means responsive to the correlation signals for effecting the control relationship between the controlled apparatus and the controlling apparatus. The correlation system can comprise spatially transmitted signals.

The correlation system includes programming means. The programming means comprise a wand having a hand-held configuration, and a programmable controller. Switching means are provided which are manually operable by a user so as to generate state signals as input signals to the programmable controller. The programmable controller is responsive to the state signals so as to execute particular functions as desired by the user. The wand also includes mode selector means, adapted for receiving separate and independent inputs from the user. The mode selector means is further adapted to generate and apply second state signals as input signals to the programmable controller.

The wand also includes transmitting means for transmitting the correlation signals to the controlled apparatus and to the controlling apparatus. The programmable controller is responsive to the state signals and to the second state signals for applying activation signals to the transmission means. The transmission means can comprise an IR emitter. The correlation system can include a communication network for electronically coupling the controlling apparatus to the controlled apparatus. The controlled apparatus can include at least one controlled programmable controller, having a unique address identifiable through the communication network of the correlation system. The controlled apparatus can also include sensing means responsive to the correlation signals for applying control signals to the controlled programmable controller. Correspondingly, the controlling apparatus can include at least one controlling programmable controller having a unique address identifiable through the communications network of the correlation system. Sensing means are responsive to the correlation signals, for applying control signals to the controlling programmable controller.

The controlling apparatus can include a plurality of switch units. Correspondingly, the controlled apparatus can include a plurality of lighting units. The wand can include a trigger switch manually operable by the user, so as to generate state signals as input signals to the programmable controller. The wand can also include a visible light having first and second states. The programmable controller can be adapted to selectively generate and apply activation signals as input signals to the visible light, so as to change the state of the visible light between the first and second states.

The wand can also include a lens spaced forward of the visible light, with the lens being transparent to both visible and infrared light. The lens can be a collimating lens for purposes of focusing the visible light into a series of parallel light paths. The correlation system can include a plurality of separate and independent programming means.

The mode selector means can be adapted to generate and apply second state signals to the programmable controller as signals indicative of SET, ADD and REMOVE command signals. The controlled apparatus can include transmission means for transmitting address code signals to the programming means, where the address code signals are representative of a unique address of the controlled apparatus. Each of the wands can include means for indicating successful reception and execution of command signals. The means for indicating successful reception and execution of command signals can include a visible light.

Further in accordance with the invention, a method is provided for use in a correlation system for configuring and modifying a control relationship between controlling apparatus and controlled apparatus. The method includes the use of a programming means comprising a hand-held configuration manually operable by a user so as to transmit correlation signals to the controlled apparatus and the controlling apparatus. Receipt of correlation signals are sensed at the controlled apparatus. Further, receipt of correlation signals are also sensed at the controlling apparatus. A control relationship is effected between the controlled apparatus and the controlling apparatus, based on transmitted correlation signals.

A method in accordance with the invention also includes determining, through programmable processes, prior sets of correlation signals transmitted by the programming means. Determinations are made of next prior sets of correlation signals transmitted to the controlling apparatus. A particular control relationship is effected between the controlled apparatus and the controlling apparatus based on a sequential relationship existing between transmission of the correlation signals to the controlled apparatus and correlation signals to the controlling apparatus.

The method in accordance with the invention also includes configuring a particular controlling apparatus so as to control states of a plurality of controlled apparatus. The method further includes steps for effecting a master/slave relationship among two or more of the controlled apparatus.

A further method in accordance with the invention includes use of the wand for transmitting a first particular command signal C to switch S, where C is representative of the sequence number of the command signal from the wand, and S is representative of the particular switch to which the command signal is transmitted. A second particular command signal C+1 is transmitting to light L, where L is representative of a particular one of the lights to which the command signal C+1 is transmitted. A third particular command signal C+2 is transmitted to light M, where M is representative of a particular one of the lights. A fourth particular command signal C+3 is transmitted to light N, where N is also representative of a particular one of the lights. A fifth particular command signal C+4 is transmitted to switch T, where T is representative of a particular one of the switches. A determination is made that command signal C+3 was a command signal to the light N. Control is effected between light N and switch T. A determination is then made that command signal C+2 was a command signal to light M, and control is effected of light M by switch T. Command signal C+1 is then determined as a command signal to light L, and control of light L is effected by the switch T. A determination is then further made that command signal C was a command signal to the switch S, and a further determination is made that a particular sequential configuration of control is completed.

The foregoing method also includes transmitting a sixth particular command signal C+5 to switch U, where U is representative of a particular other one of the switches. A determination is then made that command signal C+4 was transmitted to switch T. A control relationship is then effected so that switch U is a master switch for control of lights L, M and N, and switch T is slaved to switch U.

A further method in accordance with the invention includes the use of the wand for transmitting control signals to certain ones of lights. Further command signals are transmitted to particular ones of switches. A controlling relationship is then removed between the switches and the lights, based upon the command signals.

DETAILED DESCRIPTION OF THE INVENTION

Figure 1:
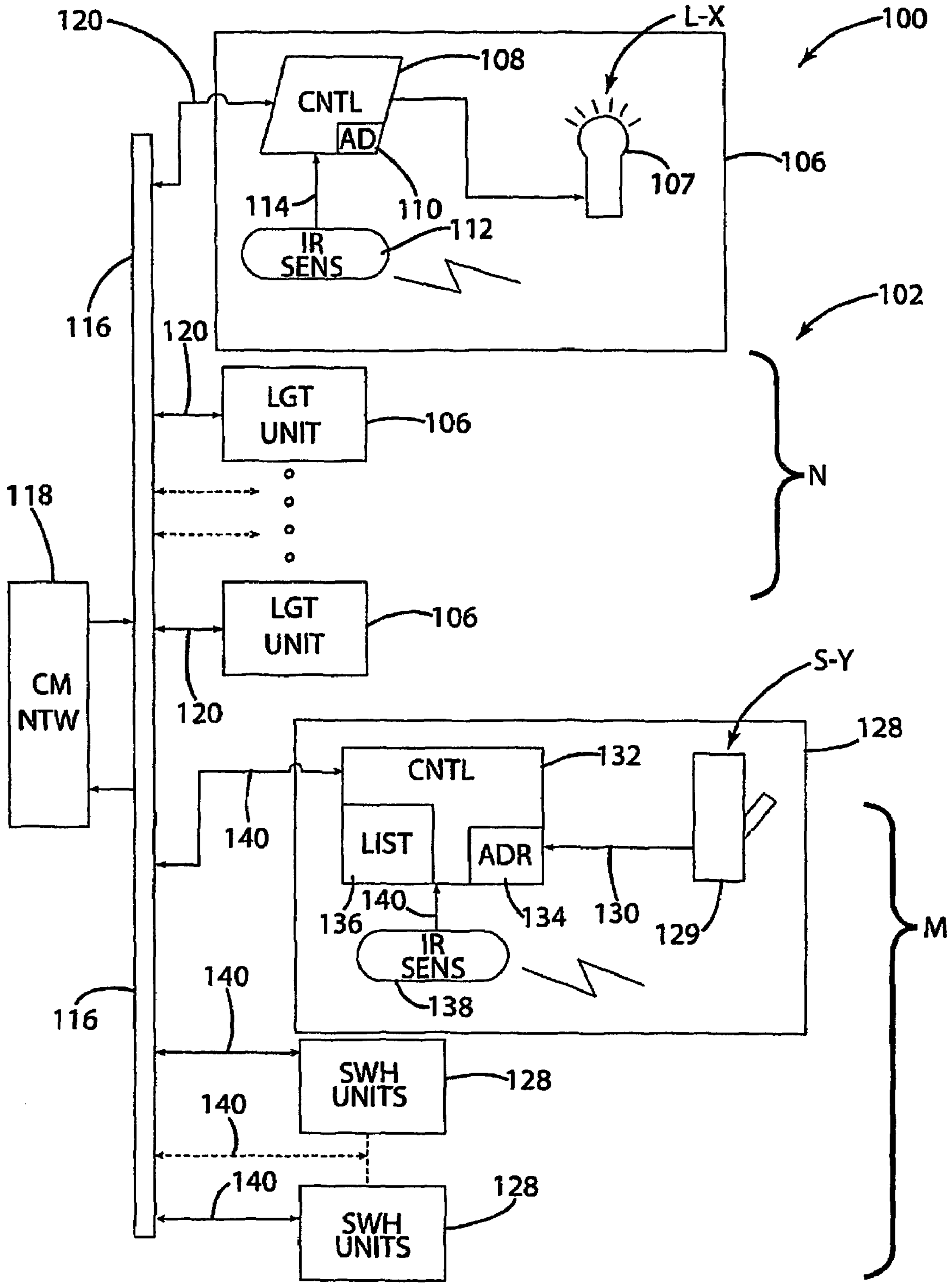
FIG. 1 illustrates an example embodiment of a communications network in accordance with the invention, showing details in block diagram format of a lighting unit and a switch unit.

The principles of the invention are disclosed, by way of example, in a switch/light correlation system which is adapted for use with a lighting system 102 as illustrated in FIG. 1. In accordance with the invention, the lighting system 102 is associated with one or more wands 104, with an example embodiment of one of the wands 104 being illustrated in FIG. 1. The wand 104 is utilized with the lighting system 102 so as to initially configure or reconfigure relationships or correlations among switches and lights of the lighting system 102. That is, the wand 104 provides a manual, handheld means for determining which of the lights of the lighting system 102 are controlled by which of the switches of the lighting system 102. Control of the lighting system 102 in accordance with the invention is provided through the use of relatively inexpensive apparatus, which is readily usable by the layperson.

Turning specifically to FIG. 1, the lighting system 102 includes a plurality of lighting units 106. In the particular embodiment illustrated in FIG. 1, there are n individual lighting units 106. Each lighting unit 106 includes a conventional light 107. The light 107 may be any one of a number of conventional lights, including florescent and LED devices. In view of the capability of the use of various types of lighting devices, the entirety of the correlation system may be one in which AC and/or DC devices are employed. Further, the lighting devices and other components associated with the correlation system in accordance with the invention may employ high voltage and low voltage functionality. The light 107 is electrically interconnected to and controlled by a controller 108, with each of the controllers 108 associated with one of the lighting units 106. Each of the controllers 108 may be a conventional programmable controller. Each programmable controller 108 will have a unique address 110 identifiable through the communications network of the lighting system 102.

Each of the lighting units 106 further includes an infrared (IR) sensor 112. The IR sensor 112 is conventional in nature and may be any one of numerous commercially available IR sensor devices. An IR sensor 112 is associated with each of the lighting units 106, and is utilized to receive IR signals from the wand 104 as described in subsequent paragraphs herein. Each of the IR sensors 112 is adapted to convert IR signals from the wand 104 to electrical signals, and apply the same to the corresponding controller 108 through line 114.

Referring again to each of the controllers 108, each controller has bi-directional communication with a control bus 116 or similar common interface used to provide for control and communication among various devices, such as the lighting units 106 and the switch units to be described in subsequent paragraphs herein. The control bus 116 or a similar communications interface is associated with a communications network 118. Communications network 118 may be sophisticated in design and provide for network control of a number of different devices associated with environmental systems, in addition to switch and lighting apparatus. For example, communications network 118 may be associated with network control of sound management, electrical supply (both AC and DC), HVAC and other environmental control systems. Alternatively, communications network 118 may be relatively simplistic in design and provide only a few functions associated solely with switches and lights. Each controller 108 associated with a lighting unit 106 communicates with the control bus 116 through a line 120. Each controller 108 may have the capability of not only storage of a unique address 110 associated with the corresponding light 107, but may also store other information, such as light state and the like.

In addition to the lighting unit 106, the lighting system 102 may also include a plurality of switch units 128. Each of the switch units 128 is utilized to control one or more of the lighting units 106. In the particular embodiment illustrated in FIG. 1, the lighting system 102 includes a series of m switch units 128. Referring to the specific switch unit 128 illustrated partially in schematic format in FIG. 1, the switch unit 128 includes a conventional switch 129. A switch 129 is associated with each one of the switch units 128. Each switch 129 can be any one of a number of conventional and commercially available switches.

Each of the switches 129 converts manual activation or deactivation into an output state applied on line 130. The state of switch 129 on line 130 is applied as an input to a conventional controller 132. Controller 132 is preferably a conventional programmable controller of any of a series of commercially available types. Each of the controllers 132 may correspond in structure to the controllers 108 associated with the lighting units 106. As with each of the controllers 108 of the lighting units 106, the controllers 132 each have a unique address 134 associated therewith. Each controller 132 may also include various programmable instructions and memory storage which may comprise a light control list 136 stored in writeable memory.

Each of the switch units 128 also includes an IR sensor 138. Each of the IR sensors 138 may correspond in structure and function to the IR sensors 112 associated with each of the lighting units 106. That is, each of the IR sensors 138 is adapted to receive IR signals as inputs signals, and convert the same to corresponding electrical signals. The electrical signals are applied as input signals on line 140 to the corresponding controller 132. As will be described in subsequent paragraphs herein, the input IR signals to the IR sensor 138 will be received from the wand 104, and will be utilized to compile and modify the light control list 136.

As with each of the controllers 108 associated with the lighting units 106, the controllers 132 associated with the switch units 128 will have bi-directional communication through line 140 with the control bus 116 of the communications network 118. Each of the switch units 128 may be configured (in accordance with methods described in subsequent paragraphs herein) so as to control one or more of the lights 107 of the lighting units 106. The general programmable control as specifically associated with the switch units 128 and the lighting units 106 is relatively straightforward, in that each of the controllers 132 may include, as part of the light control list 136, identifications of each of the unique addresses 110 of the lighting units 106 associated with the lights 107 to be controlled.

Figure 2:
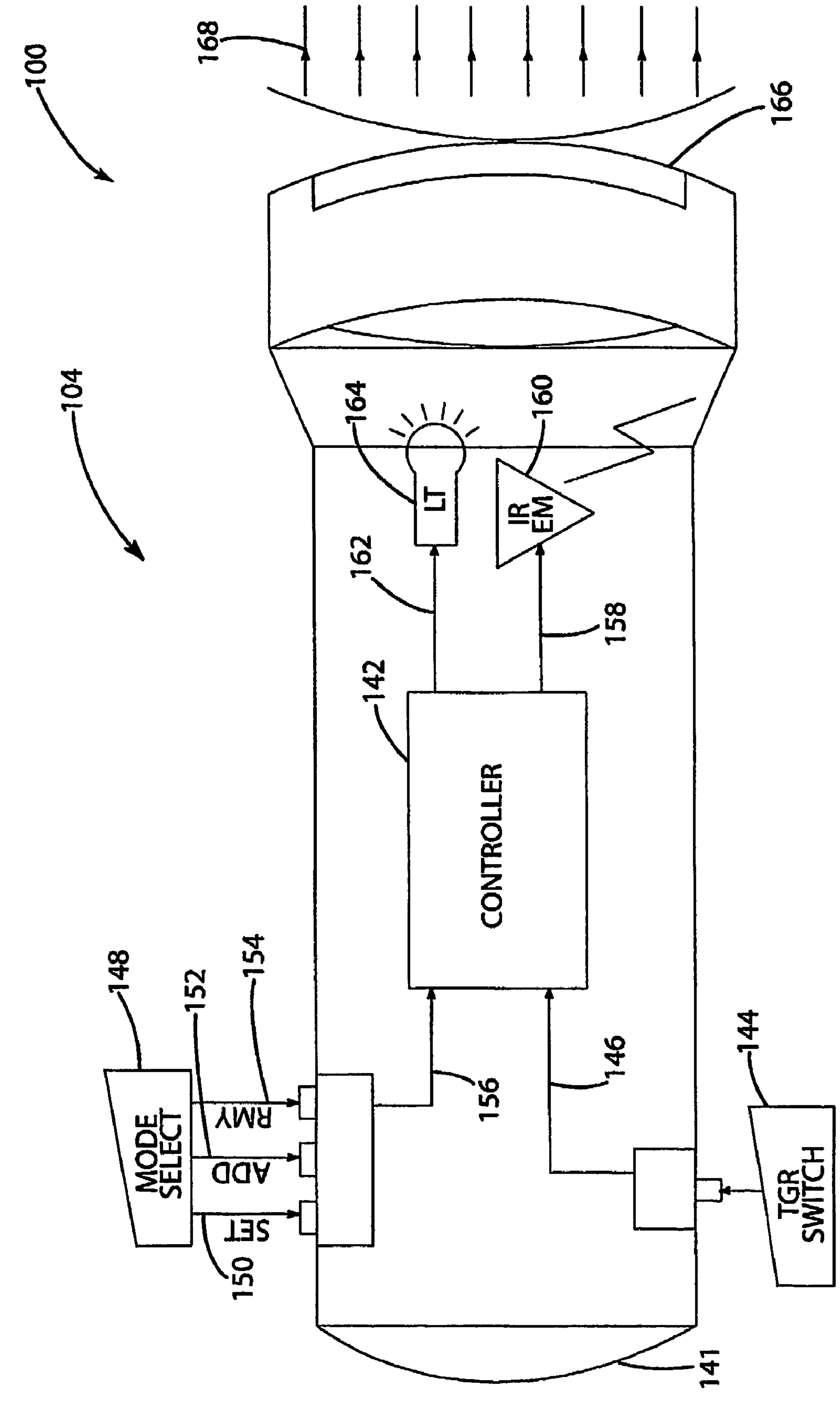
FIG. 2 is a block diagram partially in schematic format, illustrating a wand structured in accordance with the invention.

For purposes of controlling correlation or configuration among the lighting units 106 and the switch units 128, the embodiment illustrated in the drawings and in accordance with the invention includes a wand 104 as shown in block diagram format in FIG. 2. The wand 104 may include any type of desired mechanical structure, preferably including a housing 141. Enclosed within or otherwise interconnected to the housing 141 is a conventional programmable controller 142. The programmable controller 142 may be any of a number of conventional and commercially available controllers, preferably sized and configured for convenience of use within a device such as the handheld wand 104. The wand 104 also preferably includes a trigger switch 144. The trigger switch 144 may be manually operated by the user so as to generate a state signal as an input on line 146 to the controller 142. The state signal on line 146 may be a responsive signal to activation of the trigger switch 144 so as to cause the controller 142 to perform particular functions desired by the user.

The wand 104 also includes a mode selector module 148. The mode selector module 148 may preferably comprise a selector switching module adapted for three separate and independent inputs from the user. More specifically, the mode selector module 148 may include a SET switch 150, ADD switch 152 and REMOVE switch 154. The mode selector module 148 is adapted so as to generate and apply a state signal on line 156 as an input signal to the controller 142. The state signal on line 156 will preferably be of a unique state, dependent upon selective activation by the user of any one of the switches 150, 152 or 154. As with other specific elements of the wand 104, the mode selector module 148 may be one of any number of commercially available three switch modules, providing unique state outputs.

In response to state signals from the mode selector module 148 on line 156, and the trigger switch 144 on line 146, the controller 142 is adapted to apply activation signals on line 158, as input activation signals to an IR emitter 160. The IR emitter 160 is conventional in design and structure and adapted to transmit IR signals in response to activation signals from line 158.

In addition to controlling transmission of IR signals from the IR emitter 160, the controller 142 is also adapted to selectively generate and apply activation signals on line 162. The activation signals on line 162 are applied as signals to a visible light 164. As with the IR emitter 160, the visible light 164 may be any of a number of appropriate and commercially available lights for the purposes contemplated for use of the wand 104 in accordance with the invention.

In addition to the foregoing, the wand 104 may also preferably include a lens 166 spaced forward of the visible light 164. The lens 166 is preferably a lens which is transparent to both visible and infrared light. The lens 166 is also preferably a collimating lens for purposes of focusing the visible light 164 into a series of parallel light paths (e.g. a collimated light beam 168). The foregoing describes the general structure of one embodiment of a switch/light correlation system in accordance with the invention. The correlation system may be characterized as correlation system 100, which comprises the lighting system 102 and the wand 104. The operation of the correlation system 100 will now be described with reference to FIGS. 1 and 2.

As earlier stated, a principal concept of the invention is to provide a means for configuring (or reconfiguring) the communications network, so that certain of the switch units 128 control certain of the lighting units 106. For these purposes, a plurality of wands 104 may be utilized. For example, the wands 104 may be numbered W-1, W-2, W-3 . . . W-a, where a is the total number of wands 104. An individual wand 104 may be characterized as wand W-A, where A is the particular wand number 1 through a.

As earlier described, each of the wands 104 may be utilized to initiate one of three commands, namely SET, ADD or REMOVE, through use of the mode selector module 148, and its switches 150, 152 and 154. More specifically, and as an example, the user may wish to initiate a SET command for purposes of associating one or more of the switches 129 with one or more of the lights 107. The user may first activate the SET switch 150. At the time the SET command is to be transmitted to an appropriate one of the lights 107 or switches 129, the trigger switch 144 is activated by the user. The controller 142 of the wand 104, in response to the SET command signal and the trigger switch signal, will generate appropriate electrical signals to the IR emitter 160. The IR emitter 160, in turn, will transmit IR signals representative of the SET command. These IR signals will be received as input signals by the respective IR sensor 112 or 138 associated with the lighting unit 106 or switch 128, respectively, to which the wand 104 is then currently pointed.

For purposes of describing available configuration sequences for control of the lighting units 106 through the switch units 128, it is advantageous to number the lights 107 and switches 129. As earlier stated, the embodiment illustrated in FIGS. 1 and 2 utilize n lights 107 and m switches 129. An individual light 107 may be characterized as light L-X, where X is an integer from 1 to n. Correspondingly, an individual switch 129 may be characterized as switch S-Y, where Y is an integer from 1 to m.

For operation in accordance with the invention, the lighting system 100 will also maintain memory of each particular command and command number for each of the wands 104. For purposes of description, each command may be referenced as C-N, where N is the sequential number of the command generated by a specific wand 104. For example, a command referenced herein as W-4, C-3 would reference the third command from the fourth wand 104. To fully identify a particular command, it may be designated as W-4, C-3, SET, meaning that IR signals are generated from the fourth wand 104, indicating that, in fact, the signals are from the fourth wand, they represent the third command from the fourth wand, and they are indicative of a SET command.

If the wand 104 is being "pointed" to, for example, light L-2 when the trigger switch 144 is activated, the complete "directional" command may be characterized as W-4, C-3, SET, L-2. Correspondingly, if the wand is pointed at S-4, for example, the directional command may be characterized as W-4, C-3, SET, S-4. To designate ADD and REMOVE commands, the "SET" designation would be replaced by the designation "ADD" or "REMOVE," respectively.

A specific sequential process will now be described as an embodiment in accordance with the invention to relate or correlate control between a particular one of the switches 129 and the lights 107. Assume that the user wishes to configure the lighting system 100 such that switch S-6 is to control light L-4. Further assume that the sixth wand 104 is being utilized by the user, and the last command transmitted by wand W-6 was the fourteenth command (e.g. C-14). Let it be further assumed that command C-14 from wand W-6 was transmitted to one of the switches 129. The user would first configure the mode selector module 148 for wand W-6 so as to enable the SET switch 150. The wand W-6 is than pointed to the lighting unit 106 associated with light L-4. The directional configuration of the wand 104 is indicated by the collimated light beam 168. With this configuration, the user may activate the trigger switch 144 of wand W-6. To indicate transmittal of the command, the light 164 may preferably be "blinked" so as to indicate appropriate command transmittal. The command may be characterized as W-6, C-15, SET, L-4. The command is transmitted to light L-4 through transmittal of IR signals from the IR emitter 160 associated with wand W-6. These IR signals will be received by the IR sensor 112 associated with the lighting unit 106 for light L-4. IR signals received by the IR sensor 112 are converted to corresponding electrical signals applied to the corresponding controller 108 through line 114. These signals are then also available to the communications network 118.

Following transmittal of the SET command to light L-4, the user then "points" the wand W-6 to switch S-6 of the set of switches 129. When the wand W-6 has an appropriate directional configuration as indicated by the collimated light beam 168, the trigger switch 144 can again be activated, thereby transmitting IR signals through the IR emitter 160 to switch S-6, indicative of a SET command. This directional command can be characterized as W-6, C-16, SET, S-6. The IR signals transmitted by the IR emitter 160 will be received by the IR sensor 138 associated with the switch unit 128 for switch S-6 of the set of switches 129. IR signals received by the IR sensor 138 from wand W-6 are converted to electrical signals on line 140 and applied as input signals to the corresponding controller 132. Signals indicative of the command are also made available to the communications network 118.

When this particular command is received by switch unit 128 for switch S-6, program control via controllers 108, 132, and communications network 118 will have knowledge that the SET command sent to switch S-6 was the sixteenth command from wand W-6. Programmable processes are then undertaken to determine the particular command corresponding to the fifteenth command from wand W-6, i.e. W-6, C-15. Through the prior storage of data associated with the command W-6, C-15, a determination is made that this particular command was a SET command transmitted to light L-4. With this information, the communications network 118 is provided with sufficient data so as to configure the lighting system 100 such that switch S-6 is made to control light L-4. Following this determination with respect to command C-15 for wand W-6, a search is made for the fourteenth command (e.g. C-14) transmitted from W-6. If it is determined that command C-14 from wand W-6 was a command transmitted to one of the switches 129, and not to any one of the lights 107, this particular sequence for configuration of the lighting system is then complete. Upon completion, activation of switch S-6 is made to control light L-4.

The foregoing sequence is an example of where a single one of the switches 129 is made to control a single one of the lights 107. In accordance with the invention, the lighting system 100 may also be configured so as to have one of these switches 129 control two or more of the lights 107. To illustrate a configuration sequence for control of three of the lights 107 by a single one of the switches 129, an example similar to the foregoing example using commands from wand W-6 may be utilized. More specifically, it can be assumed that command C-12 from wand W-6 was a command directed to one of the switches 129. It can be further assumed that the user wishes to have switch S-6 control not only light L-4, but also lights L-7 and L-10. Using wand W-6, the user may than transmit a SET command to light L-10 as the thirteenth command from wand W-6. That is, the command will be described as W-6, C-13, SET, L-10. Directional pointing of the wand W-6 toward light L-10 would be in accordance with the prior description herein. After command C-13 is transmitted, a further SET command can be transmitted to L-7. This will be the fourteenth command from wand W-6, and would be indicated as W-6, C-14, SET, L-7. Following this command, the two SET commands C-15 and C-16 for light L-4 and switch S-6, respectively, can be transmitted as described in the prior example. Following the receipt of command C-16 by the switch unit 128 associated with switch S-6, the communications network 118 and the associated controllers 108, 132 would than be made to search for data indicative of command C-15 from wand W-6. Upon a determination that command C-15 was a SET command to light L-4, switch S-6 would be made to control light L-4.

A further search would than be made for command C-14 from wand W-6. Unlike the prior example, the lighting system 100 would make a determination that this particular command was a SET command to light L-7, rather than a command to a switch 129. With command C-14 being transmitted to light L-7, the communications network 118 would be configured so that switch S-6 would be made to control not only light L-4, but also light L-7. Thereafter, the lighting system 100 would be made to search for data indicative of command C-13 from wand W-6. Upon a determination that command C-13 was a SET command to light L-10, the switch S-6 would be further configured through the communications network 118 so as to control not only lights L-4 and L-7, but also light L-10. A search for data indicative of command C-12 from wand W-6 would then be undertaken by the communications network 118. Upon determining that this particular command was a command directed to one of the switches 129, the communications network 118 would determine that this particular sequential configuration is completed. Upon completion, the controller 132 of the switch unit 128 associated with switch S-6 will include a light control list 136 having data indicative of switch S-6 controlling lights L-4, L-7 and L-10. Program control through the appropriate controllers and the communications network 118 will than effect this configuration, so that switch S-6 will have control of all three of the designated lights.

The foregoing examples of sequential configuration in accordance with the invention have illustrated the setting of control of a single light 107 by a single switch 129, and the setting of control of three of the lights 107 by a single switch 129. In addition to these functions, the lighting system 100 in accordance with the invention can also operate so as to configure a "master/slave" relationship among two or more of the switches 129. As an example, it can be assumed that wand W-6 was utilized to transmit a series of commands C-12, C-13, C-14, C-15 and C-16 as described in the foregoing paragraphs. It may also be assumed that the commands were exactly as described in the foregoing paragraphs in that the commands C-13 through C-16 were made to cause switch S-6 to control lights L-10, L-7 and L-4. A seventeenth command may then be generated through the use of wand W-6, with the command being a SET command and the wand W-6 being pointed at switch S-8. This command would be designated as W-6, C-17, SET, S-8. This command will be transmitted in accordance with the procedures previously described herein with respect to other SET commands. Upon receipt of IR signals by the IR sensor 138 associated with the switch unit 128 for switch S-8, the controllers and communications network 118 would than be made to search for data indicative of command C-16 from wand W-6. The data indicative of command C-16 from wand W-6 would indicate that this particular command was a SET command to switch S-6. Accordingly, the command C-16, which was immediately prior to command C-17 from wand W-6, was a command directed to a switch, rather than a light. Upon a determination that this immediately prior command C-16 was directed to switch S-6, and a determination that command C-15 was directed to a light L-4, program control through the communications network 118 would configure the lighting system 100 so that switch S-8 will be configured by the communications network 118 as a "master" switch for control of lights L-10, L-7 and L-4, while switch S-6 is "slaved" to switch S-8.

The foregoing commands from one of the wands 104 have been described with respect to SET commands. As earlier described, the mode selector module 148 also includes an ADD switch 152 and a REMOVE switch 154. Functionality of the lighting system 100 for purposes of these particular functions is similar to the functionality for the SET commands. Accordingly, relatively simple configuration sequences will be described in the subsequent paragraphs with respect to examples of use of the ADD and REMOVE commands. Continuing with the example of use of wand W-6, and assuming that a SET command would be the eighteenth command C-18, the mode selector module 148 may be set by the user so as to enable the ADD switch 152. Assume that the user wishes to add light L-20 to the control list for switch S-10. The user would than point the wand W-6 to light L-20, and activate the trigger switch 144 so as to transmit command W-6, C-18, ADD, L-20. Following transmittal of this command, the user may than transmit a further ADD command by pointing the wand W-6 to switch S-10. The command transmitted would be characterized as W-6, C-19, ADD, S-10. Upon receipt of the ADD command for switch S-10, the controllers 108, 132 and the communications network 118 would than search for data indicative of command C-18 from W-6. Data would be found indicative of command C-18 being an ADD command transmitted to light L-20. Accordingly, the communications network 118 would be configured so as to ADD light L-20 to the list of lights 107 which are under control of switch S-10. A further search would than be made for data indicative of command C-17 from wand W-6. Upon obtaining data indicative of the fact that command C-17 was a SET command to switch S-6, the configuration sequence would than be considered complete. That is, light L-20 would be controlled by switch S-10. Use of the ADD command, instead of the SET command, will cause light L-20 to be added to the lights 107 then currently being controlled by switch S-10.

In accordance with the foregoing description, it is apparent that if command C-17 had been an ADD command associated with a particular light, then not only light L-20, but also the light associated with command C-17 would also be added to the list of lights 107 controlled by switch S-10.

In addition to the SET and ADD commands, the user may also employ a REMOVE command. The REMOVE mode may be selected by enabling the REMOVE switch 154 of the mode selector module 148 associated with the particular wand 104 to be used. Functionality of the REMOVE command is similar to the functionality associated with use of the SET and ADD commands. To illustrate use of the REMOVE command, it can be assumed that the user wishes to REMOVE control of light L-30 by switch S-25. Using wand W-6, the user may enable the REMOVE switch 154, point the wand W-6 to light L-30, and activate the trigger switch 144. This causes transmittal of the command W-6, C-20, REMOVE, L-30. Upon completion, the user may then point wand W-6 to switch S-25, and again transmit a REMOVE command. This command may be characterized as command W-6, C-21, REMOVE, S-25. Upon receipt of the signals indicative of command C-21, the switch unit 128 associated with switch S-25 would than cause the communications network 118 to search for data indicative of command C-20 from wand W-6. Upon retrieval of data indicating that command C-20 from wand W-6 was a REMOVE command transmitted to light L-30, the communications network 118 would be reconfigured so as to REMOVE light L-30 from control by switch S-25. A further search would than be made for data indicative of command C-19 from wand W-6. Upon obtaining data indicating that command C-19 was a command directed to switch S-10, the REMOVE process would be considered complete. Through this reconfiguration, light L-30 would no longer be controlled by switch S-25. It will be apparent from the description of the foregoing configuration processes that control of two or more of the lights 107 may be REMOVED from a particular one of the switches 129, through processes similar to the foregoing.

The foregoing describes particular embodiments of a lighting system 100 in accordance with the invention. It will be apparent that other embodiments in accordance with the invention may be utilized, without departing from the principal concepts of the invention. For example, it would also be possible to have an IR emitter associated with each of the lighting units 106, and an IR emitter associated with each of the switch units 128. Correspondingly, an IR sensor could then be employed within each of the wands 104. With this type of configuration, each of the wands 104 may be utilized to receive and to transmit IR signals. Correspondingly, each of the switch units 128 and lighting units 106 can also be enabled to transmit IR signals. As an example of commands which can be utilized with this type of configuration, a command could be generated from a wand 104 or a switch unit 128 requesting certain of the lights 107 to "broadcast" their individual addresses. For purposes of undertaking such activities by a switch unit 128, various commands other than merely SET, REMOVE and ADD commands could be transmitted from each of the wands 104. With the foregoing types of configurations, switch units 128 may be made to directly transmit commands to lighting units 106 through spatial signals.

Still further, sensors could be included within switch units 128 and the wands 104 so as to sense visible light itself. With this type of configuration, commands may be transmitted to the lighting units 106 so as to cause the lights 107 themselves to "blink" their own codes, such as their unique addresses. It is apparent that other variations of spatial signal transmission/reception may be utilized in accordance with the invention, without departing from the novel concepts thereof.

In addition to the foregoing, it is also possible in accordance with the invention to include additional features regarding "feedback" to each of the wands 104. That is, it may be worthwhile to include means for indicating successful reception and execution of a command. In this regard, for example, and as earlier described herein, the visible light 164 for each of the wands 104 may be made to "blink" when the trigger switch 144 is activated, indicating the transmission of a command. Other functionality may be included to provide feedback, such as each of the lights 107 which is the subject of a command from one of the wands 104 being made to "blink" or otherwise indicate successful reception or completion of a command. Still further, and as somewhat earlier described herein, it would also be feasible in accordance with the invention to cause a switch unit 128 and the communications network 118 to cause all of the lights 107 which are the subject of a series of commands to "blink" so as to further indicate successful reception and/or completion of a command sequence. Various other means of feedback to the user and to the wands 104 may be employed without departing from the novel concepts of the invention.

It will be apparent to those skilled in the pertinent arts that other embodiments of lighting systems in accordance with the invention may be designed. That is, the principles of a lighting system for configuring control among switch units and lighting units through the use of a remote device are not limited to the specific embodiments described herein. For example, and as described in previous paragraphs, various configurations of spatial signal transmitters and receivers may be utilized among the lighting units, switch units and wands. Accordingly, it will be apparent to those skilled in the art that modifications and other variations of the above-described illustrious embodiments of the invention may be effected without departing from the spirit and scope of the novel concepts of the invention.

The invention claimed is:

1. A correlation system for configuring and modifying a control relationship between controlling apparatus and controlled apparatus, said correlation system comprising:

programming means comprising a hand-held configuration and manually operable by a user to transmit correlation signals to said controlled apparatus and to said controlling apparatus; and said controlled apparatus and said controlling apparatus each having sensing means responsive to said correlation signals for effecting said control relationship between said controlled apparatus and said controlling apparatus.

2. A correlation system in accordance with claim 1, characterized in that said correlation signals comprise spatially transmitted signals.

3. A correlation system in accordance with claim 1, characterized in that said programming means comprises:

a wand having a hand-held configuration;

a programmable controller;

switching means manually operable by a user so as to generate state signals as input signals to said programmable controller; and said programmable controller is responsive to said state signals so as to execute particular functions as desired by said user.

4. A correlation system in accordance with claim 3, characterized in that said wand further comprises mode selector means, adapted for receiving separate and independent inputs from said user, and further adapted to generate and apply second state signals as input signals to said programmable controller.

5. A correlation system in accordance with claim 4, characterized in that:

said wand further comprises transmitting means for transmitting said correlation signals to said controlled apparatus and to said controlling apparatus; and said programmable controller is responsive to said state signals and to said second state signals for applying activation signals to said transmission means.

6. A correlation system in accordance with claim 5, characterized in that said transmission means comprises an IR emitter.

7. A correlation system in accordance with claim 1, characterized in that:

said correlation system further comprises a communications network for electronically coupling said controlling apparatus to said controlled apparatus;

said controlled apparatus comprises at least one controlled programmable controller having a unique address identifiable through said communications network of said correlation system; and said controlled apparatus further comprises sensing means responsive to said correlation signals for applying control signals to said at least one controlled programmable controller.

8. A correlation system in accordance with claim 7, characterized in that said controlling apparatus comprises:

at least one controlling programmable controller having a unique address identifiable through said communications network of said correlation system; and sensing means responsive to said correlation signals, for applying control signals to said at least one controlling programmable controller.

9. A correlation system in accordance with claim 1, characterized in that said controlling apparatus comprises a plurality of switch units.

10. A correlation system in accordance with claim 1, characterized in that said controlled apparatus comprises a plurality of lighting units.

11. A correlation system in accordance with claim 3, characterized in that said wand further comprises a trigger switch manually operable by said user, so as to generate further state signals as input signals to said programmable controller.

12. A correlation system in accordance with claim 3, characterized in that:

said wand further comprises a visible light having first and second states; and said programmable controller is adapted to selectively generate and apply activation signals as input signals to said visible light, so as to change a state of said visible light between said first and second states.

13. A correlation system in accordance with claim 12, characterized in that:

said wand further comprises a lens spaced forward of said visible light, with said lens being transparent to both visible and infrared light; and said lens being a collimating lens for purposes of focusing said visible light into a series of parallel light paths.

14. A correlation system in accordance with claim 1, characterized in that said system comprises a plurality of separate and independent programming means.

15. A correlation system in accordance with claim 4, characterized in that said mode selector means is adapted to generate and apply said second state signals to said programmable controller as signals indicative of SET, ADD and REMOVE command signals.

16. A correlation system in accordance with claim 1, characterized in that said controlled apparatus comprises transmission means for transmitting address code signals to said programming means, where such address code signals are representative of a unique address of said controlled apparatus.

17. A correlation system in accordance with claim 16, characterized in that each of said wands includes means for indicating successful reception and execution of command signals.

18. A correlation system in accordance with claim 17, characterized in that said means for indicating successful reception and execution of command signals comprises a visible light.

* * * * *